United States Patent
Bi et al.

(10) Patent No.: US 9,329,873 B2
(45) Date of Patent: May 3, 2016

(54) METHOD AND DEVICE, TERMINAL AND COMPUTER READABLE MEDIUM FOR ACCELERATING STARTUP OF OPERATING SYSTEM

(71) Applicant: Tencent Technology (Shenzhen) Company Limited, Shenzhen, Guangdong (CN)

(72) Inventors: Tingli Bi, Shenzhen (CN); Bin Fang, Shenzhen (CN); Kefeng Nie, Shenzhen (CN); Shiping Li, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 156 days.

(21) Appl. No.: 14/125,219

(22) PCT Filed: Mar. 20, 2013

(86) PCT No.: PCT/CN2013/072960
§ 371 (c)(1),
(2) Date: Dec. 10, 2013

(87) PCT Pub. No.: WO2013/152660
PCT Pub. Date: Oct. 17, 2013

(65) Prior Publication Data
US 2014/0129814 A1    May 8, 2014

(30) Foreign Application Priority Data
Apr. 12, 2012  (CN) .......................... 2012 1 0106270

(51) Int. Cl.
*G06F 9/44* (2006.01)
*G06F 12/08* (2016.01)

(52) U.S. Cl.
CPC ............ *G06F 9/4406* (2013.01); *G06F 9/4401* (2013.01); *G06F 12/0862* (2013.01)

(58) Field of Classification Search
CPC ........................... G06F 9/4406; G06F 12/0862
See application file for complete search history.

(56) References Cited

U.S. PATENT DOCUMENTS 8,082,431 B2   12/2011  Rothman
8,230,208 B2   7/2012   Van De Ven
(Continued)

FOREIGN PATENT DOCUMENTS

CN     1604055 A      4/2005
CN     101000549 A    7/2007
(Continued)

OTHER PUBLICATIONS

International Search Report in international application No. PCT/CN2013/072960, mailed on Jun. 13, 2013.
(Continued)

*Primary Examiner* — Albert Wang
(74) *Attorney, Agent, or Firm* — Oppedahl Patent Law Firm LLC (57) ABSTRACT

Described are an operating system startup acceleration method and device, a terminal and a computer readable medium. The method comprises: acquiring prefetch information corresponding to at least one process to be accelerated in a procedure of operating system startup, wherein the prefetch information comprises a file path, a shift value and a length value of a data block required by the process to be accelerated; and reading a corresponding data block into a system cache according to the acquired prefetch information, and completing a startup procedure of the process to be accelerated using the data block in the system cache.

8 Claims, 7 Drawing Sheets

(56) References Cited

U.S. PATENT DOCUMENTS

| | | |
|---|---|---|
| 2001/0047473 A1 | 11/2001 | Fallon |
| 2002/0019723 A1 | 2/2002 | Zwiegincew |
| 2005/0021657 A1* | 1/2005 | Negishi et al. ............... 709/213 |
| 2005/0071617 A1 | 3/2005 | Zimmer |
| 2007/0162736 A1 | 7/2007 | Wu |
| 2008/0082808 A1 | 4/2008 | Rothman |
| 2009/0158023 A1* | 6/2009 | Kern ............................... 713/2 |
| 2010/0070751 A1* | 3/2010 | Chu et al. ......................... 713/2 |
| 2010/0268927 A1 | 10/2010 | De Ven |
| 2011/0231642 A1 | 9/2011 | Fallon |
| 2012/0239921 A1 | 9/2012 | Fallon |

FOREIGN PATENT DOCUMENTS

| | | |
|---|---|---|
| CN | 101226478 A | 7/2008 |
| CN | 101246427 A | 8/2008 |
| CN | 101339511 A | 1/2009 |
| CN | 101814038 A | 8/2010 |
| CN | 101866293 A | 10/2010 |
| CN | 102171647 A | 8/2011 |
| CN | 102707966 A | 10/2012 |

OTHER PUBLICATIONS

English Translation of the Written Opinion of the International Search Authority in international application No. PCT/CN2013/072960, mailed on Jun. 13, 2013.

Notification of the First Office Action of Chinese application No. 201210106270.1, issued on Aug. 12, 2013.

Notification of the Second Office Action of Chinese application No. 201210106270.1, issued on Jan. 20, 2014.

\* cited by examiner

METHOD AND DEVICE, TERMINAL AND COMPUTER READABLE MEDIUM FOR ACCELERATING STARTUP OF OPERATING SYSTEM

CLAIM OF PRIORITY

This application claims the benefit of priority to Chinese Patent Application 201210106270.1, entitled "METHOD AND DEVICE, TERMINAL AND COMPUTER READABLE MEDIUM FOR ACCELERATING STARTUP OF OPERATING SYSTEM" filed on Apr. 12, 2012, which is hereby incorporated by reference herein in its entirety.

TECHNICAL FIELD

The present disclosure relates to the field of operating systems, and in particular method and device, terminal and computer readable medium for accelerating startup of operating system.

BACKGROUND

In our daily life, terminals such as desktop computers, laptops, smart phones, tablet computers and the like have been widely deployed. Generally, these terminals adopt operating systems and third party applications running on the operating systems to provide services for users. Before a terminal could provide services to a user, the terminal should go through a procedure for starting the operating system.

Generally, the procedure for starting an operating system requires to go through the following steps: pressing a power button, running a startup bootstrap program, loading an operating system kernel, loading drivers, starting system services and third party applications and the like, and users expect operating systems to be started up as rapidly as possible to provide better user experience. Therefore, in the prior art, there are several methods for a terminal to accelerate the startup of its operating system, and one of these methods may include: system services and third party applications required to be started during the procedure of operating system startup are filtered and those that do not need to be started are forbidden so as to minimize the number of system services and third party applications required to be started in the procedure of operating system startup, and improve the speed of operating system startup.

However, in practice, many system services and third party applications are startup programs which are expected by users to be started during startup, i.e. users may wish to experience more rapid startup speed without forbidding some startup programs. The methods provided in the prior for accelerating startup of an operating system art can not fulfill such a requirement.

SUMMARY

In order to accelerate a startup procedure of operating system without forbidding some startup programs, the embodiments of the present disclosure provide a method for accelerating a startup of an operating system, and a device, a terminal and a computer readable medium thereof.

The technical solutions of the present disclosure are realized in the following way:

an embodiment of the present disclosure provides a method for accelerating a startup of an operating system, comprising:

acquiring prefetch information corresponding to at least one process to be accelerated in a procedure of operating system startup, wherein the prefetch information comprises a file path, a shift value and a length value of a data block required by the process to be accelerated;

reading a corresponding data block into a system cache according to the acquired prefetch information;

completing a startup procedure of the process to be accelerated using the data block in the system cache.

An embodiment of the present disclosure further provides a device for accelerating a startup of an operating system. The device comprises:

a prefetch information acquisition module configured to acquire prefetch information corresponding to at least one process to be accelerated in the procedure of operating system startup, wherein the prefetch information comprises a file path, a shift value and a length value of a data block required by the process to be accelerated;

a prefetch data reading module configured to read a corresponding data block into a system cache according to the acquired prefetch information;

a process startup module configured to complete a startup procedure of the process to be accelerated using the data block in the system cache.

An embodiment of the present disclosure further provides a terminal. The terminal comprises the device for accelerating a startup of an operating system according to the embodiments of the present disclosure.

An embodiment of the present disclosure further provides a computer readable medium storing computer executable instructions, the computer executable instructions are executed for implementing the methods of the present disclosure.

Following effects may be achieved by the technical solutions provided by the embodiments of the present disclosure:

By prefetching a data block which is required by all or some processes in the procedure of operating system startup, the number of occurrences of page faults and the number of read-write operations of a low-speed storage device in the procedure of operating system startup are greatly reduced and the startup time of a process corresponding to each program can be effectively reduced, thereby the effect of significantly improving the startup speed of an operating system may be achieved.

DETAILED DESCRIPTION

To make the technical solutions and advantages of the present disclosure clearer, the embodiments of the present disclosure will be further described below in details with reference to the accompanying drawings.

A procedure of operating system startup mainly refers to such a process in which a terminal starts to be powered on until various services of the operating system and all third party applications which need to run automatically during the startup have completed running. Generally, the procedure of operating system startup includes the following several stages: firstly, pressing a power button to power on a terminal; secondly, running a startup bootstrap program, such as a Basic Input Output System (BIOS), a Bootloader and the like; thirdly, loading an operating system kernel. The operating system kernel may be a "New Technology" (NT)-series kernel of a Microsoft Windows system or an open source LINUX kernel etc.; fourthly, loading drivers; fifthly, starting system services and third party applications.

Taking a Windows operating system for example, when system services and third party applications are started, each of the system services and third party applications generally correspond to a process. Basically, each process needs to load an executable file (executable file) and a Dynamic Link Library (DLL) file. When a process loads an executable file and a DLL file, it uses a memory mapping file to access the executable file and the DLL file.

Figure 1:
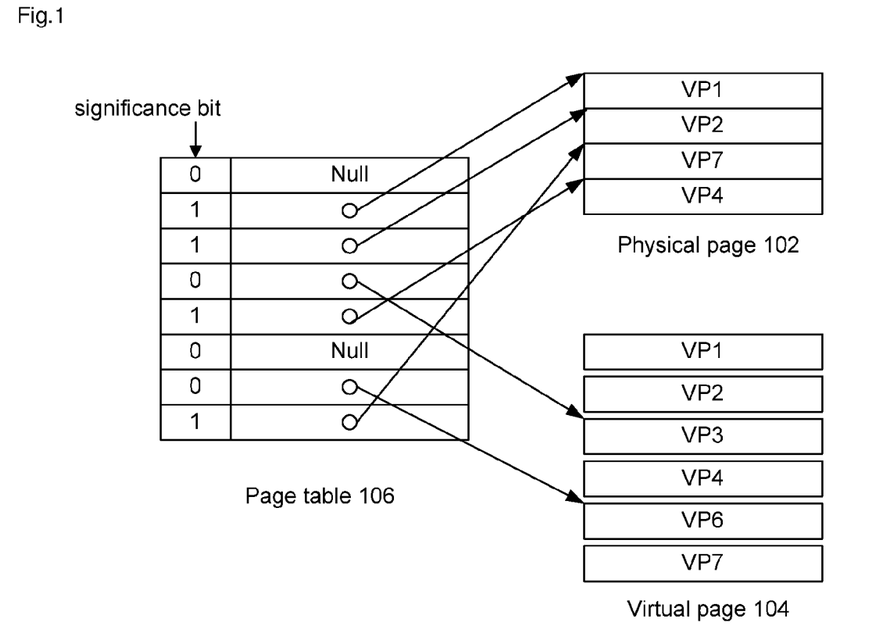
FIG. 1 is a structural diagram illustrating an operating system during memory management.

FIG. 1 illustrates a structural diagram of an operating system during memory management Generally, a terminal includes two levels of storage devices, one of which is a high speed storage device that reads and writes data rapidly, but with small capacity, such as a memory, and the other one is a low speed storage device that reads and writes data slowly, but with large capacity, such as a hard disk in a computer, a Secure Digital (SD) card in a smart phone and the like. Generally, the two levels of storage devices are different in read-write speeds by several orders of magnitude. In order to use a high speed storage device effectively, the storage space in the high speed storage device is generally divided into several physical pages 102 with a preset size. Each physical page 102 is provided with its own physical address, and each physical page may have a preset size of 4096 bytes. In order to prevent each process from misreading storage spaces of other processes, the operating system provides a virtual address space for each process. Each virtual address space is also divided into several virtual pages 104 with a preset size. Each virtual page 104 is also provided with its own virtual address. For example, a Windows system may provide a virtual address space of 2 Gigabytes (GB) to 3 GB for each process, and each virtual address space includes many 4096-byte virtual pages 104.

The operating system will maintain a page table 106 for the virtual address space of each process, so as to maintain a corresponding relation between the physical addresses of the physical pages 102 and the virtual addresses of the virtual pages 104. Since there are generally less physical pages 102, only 1 GB for example, than virtual pages 104, 2 GB of each process for example, the virtual pages 104 substantially can hardly correspond to the physical pages 102 all the time. Specifically, the page table 106 sets a significance bit and an address field for each virtual page 104. The significance bit indicates whether the virtual page 104 truly corresponds to a physical page 102. Only when a significance bit corresponding to a virtual page 104 is effective, the value in a corresponding address field after the significance bit represents the physical address of a real physical page 102. Since the virtual address space of each process in the operating system corresponds to an actual high speed storage device (e.g. a memory), page faults may occur during a memory management process as a matter of fact, i.e. when a virtual page 104 accessed by a current process is not mapped to an effective physical page 102, a page fault occurs. A soft fault occurs when the virtual page 104 is mapped to a physical page 102 with other state in a high speed storage device, while a hard fault occurs when the virtual page 104 is mapped to a file on a low speed storage device.

When a process accesses an executable file and a DLL file, the process applies a memory mapping file to access the executable file and the DLL file. The memory mapping file directly maps files on a low speed storage device (e.g. a hard disk or an SD card) to the virtual address space of the current process so that the current process can access these files like accessing a high speed storage device. Taking an executable file for example, the operating system will map the executable file through memory mapping initially, but only a small number of bytes around the mapping base address are read at the moment. The operating system will read some accessed nearby bytes only when a hard fault occurs during a real access. Apparently, since the read-write speed of a low speed storage device is lower than that of a high speed storage device by as much as several orders of magnitude for each process during a startup procedure, frequent hard faults will cost a lot of Input/Output (IO) time. For a common executable program file which usually has a relatively small file volume, the major factor that influences the IO time is the number of IO read-write operations, but not the IO size.

To reduce the number of occurrences of such page faults and the number of read-write operations of a low-speed storage device so as to accelerate the procedure of operating system startup, please refer to the following embodiments. The following embodiments are mainly described in two aspects: firstly, a prefetch information generating process, or called a learning and extracting process; secondly, a process of using the prefetch information acquired in the previous process to accelerate the procedure of operating system startup.

Embodiment 1

Figure 2:
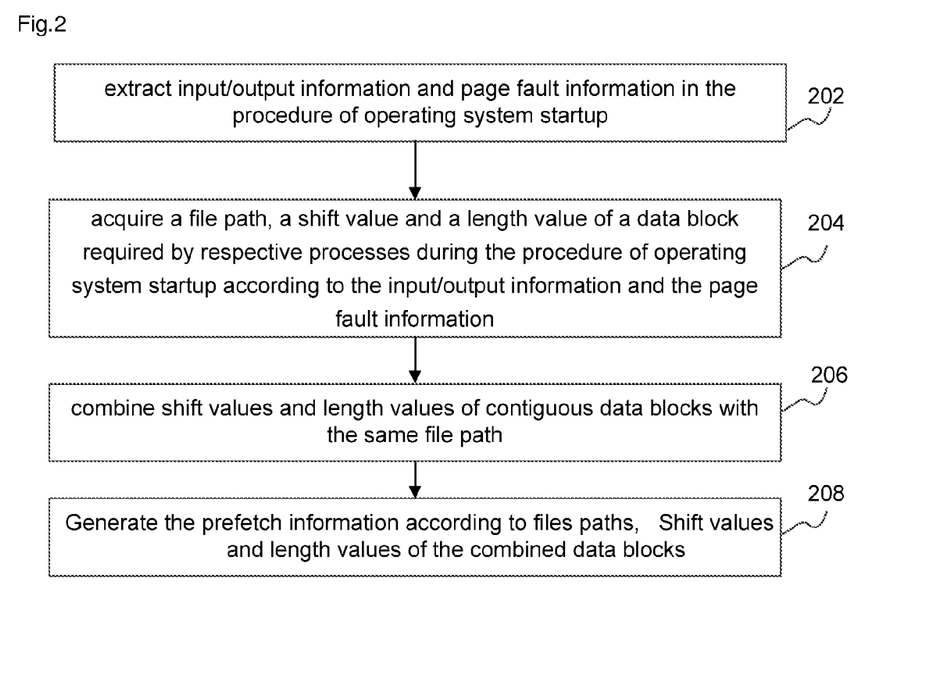
FIG. 2 is a flowchart of a prefetch information generating method provided by the first embodiment of the present disclosure.

FIG. 2 illustrates a flowchart of a method for generating prefetch information provided by the first embodiment of the present disclosure. The method for generating prefetch information may be used in a terminal or a server. In other words, the prefetch information may be generated and used by a terminal itself which needs to accelerate operating system startup. The prefetch information may be also generated by a server, and then provided by the server to the terminal which needs to accelerate operating system startup. The method for generating prefetch information comprises:

Step 202: extract input/output information and page fault information in the procedure of operating system startup.

Firstly, a log file in the procedure of operating system startup is captured. The log file includes information including IO and page faults etc. of each process during the system startup procedure.

Step 204: acquire a file path, a shift value and a length value of a data block required by respective processes during the procedure of operating system startup according to the input/output information and the page fault information Generally, a data block or a piece of data content on a low speed storage device such as a hard disk is described by the format of <file path, shift value, length value>. Taking a hard disk for example, the file path represents a file where the data block locates in the hard disk, the shift value represents the byte offset in the file where the data block locates in the hard disk and the length value represents the byte size of the data block.

The file path, shift value and length value of the data block required by each process in the procedure of operating system startup are acquired according to the IO information and the page fault information obtained in the last step. Specifically, on one hand, all data blocks involved in the IO information are arranged according to the loading sequence (the loading sequence of the data blocks can be learned from the previous procedures of operating system startup). A file path, a shift value and a length value of each data block are counted, during which the length value may be further aligned with the page size, i.e. the length value is adjusted to be a multiple of the page size (generally 4096 bytes) to facilitate access; on the other hand, all data blocks involved in the page fault information are also arranged according to the loading sequence. In addition, a file path, a shift value and a length value of each data block are counted, during which the length value may be further aligned with the page size, i.e. the length value is adjusted to be a multiple of the page size (generally 4096 bytes) to facilitate access. Since the data blocks involved in the page fault information are partially overlapped with the data blocks involved in the IO information, those overlapped with the data blocks involved in the IO information need to be removed. All data blocks acquired after analysis of the two processes above are data blocks required in the procedure of operating system startup.

To facilitate explanation, shift values and length values of three data blocks in a B.DLL file required by a process A are illustrated in Table 1:

TABLE 1

| Shift value | Length value |
|---|---|
| 0 | 4096 |
| 4096 | 4096 |
| 16384 | 4096 | where the shift value of the first data block in the B.DLL file is 0 byte and the length value is 4096 bytes; the shift value of the second data block in the B.DLL file is 4096 bytes and the length value is 4096 bytes; the shift value of the third data block in the B.DLL file is 16384 bytes and the length value is 4096 bytes.

Step 206: combine shift values and length values of contiguous data blocks with the same file path.

In Table 1, since both the first data block and the second data block belong to the B.DLL file, they have the same file path. At the same time, the last byte (i.e. shift value+length value) of the first data block is followed by the first byte (i.e. shift value) of the second data block, thus the first data block and the second data block are contiguous data blocks. Length values and shift values of contiguous data blocks may be combined to obtain a new data block.

For example, the length values and the shift values of the first data block and the second data block in Table 1 are combined, and the combination result is as shown in Table 2:

TABLE 2

| Shift | Length |
|---|---|
| 0 | 8192 |
| 16384 | 4096 | where the original first data block and second data block are combined into a new data block with a shift value of 0 and a length value of 8192. Of course, in practical application, there may be a large number of data blocks, which is not limited by several files or data blocks in the examples above.

Step 208: generate the prefetch information according to files paths, shift values and length values of the combined data blocks.

After the combination process above, the prefetch information is generated according to the file paths, shift values and length values of all data blocks for subsequent use. All data blocks here include new data blocks generated after the combination and uncombined data blocks. To facilitate use, the prefetch information may be further sorted in the prefetch information generating process, i.e. Step 208 may specifically comprise:

Step 1: sort the combined data blocks according to a preset object, wherein the preset object comprises: a process and/or a thread and/or a module to be loaded in the process and/or a file to be loaded in the process, wherein a thread is an object included in a process and a process may include a plurality of threads.

For example, the data blocks are sorted according to a required process, i.e. data blocks required in each process are sorted out respectively. For another example, the data blocks are sorted according to a required thread, i.e. data blocks required by each thread are sorted out respectively. If a more precise prefetching is required, the data blocks may be further sorted according to a module or a file to be loaded in a process.

Step 2: generate the prefetch information of the preset object according to file paths, shift values and length values of the sorted data blocks.

After the data blocks have been sorted according to the preset object, the prefetch information of the preset object is generated according to the file paths, shift values and length values of the data blocks. For example, if the data blocks are sorted according to a process, prefetch information of the process is generated; if the data blocks are sorted according to a thread, prefetch information of the thread is generated; if the data blocks are sorted according to a module, prefetch information of the module is generated; if the data blocks are sorted according to a file, prefetch information of the file is generated.

In the present embodiment, the data blocks may be sorted according to a preset object. To facilitate subsequent use, the data blocks may be also sorted according to a plurality of preset objects. Prefetch information of a corresponding preset object is acquired in subsequent application as required.

To sum up, the method for generating prefetch information provided by the first embodiment statistically analyzes the data blocks required in the procedure of operating system startup and combines the contiguous data blocks among the data blocks into new data blocks so as to obtain file paths, shift values and length values of data blocks required by processes in the procedure of operating system startup. This information may be generated into prefetch information which will be used subsequently.

Embodiment 2

Figure 3:
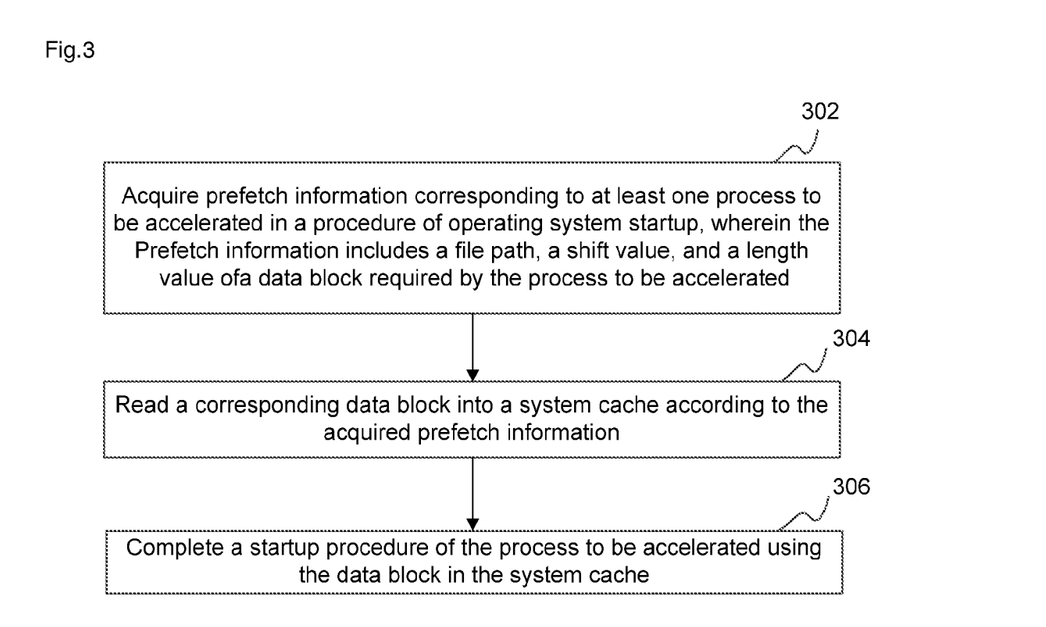
FIG. 3 is a flowchart of an operating system startup acceleration method provided by the second embodiment of the present disclosure.

FIG. 3 illustrates a flowchart of a method for accelerating a startup of an operating system provided by the second embodiment of the present disclosure. The operating system startup acceleration method may be applied in a terminal. The terminal may be any hardware device including a desktop computer, a laptop, a tablet computer, a smart phone and the like, on which an operating system runs and which includes two levels of storage devices. A database configured to store prefetch information is preset in the terminal. The method for accelerating a startup of an operating system may comprise:

302: acquire prefetch information corresponding to at least one process to be accelerated in a procedure of operating system startup, wherein the prefetch information includes a file path, a shift value and a length value of a data block required by the process to be accelerated.

In the procedure of operating system startup, all or part of the processes are designated as processes to be accelerated. For a process to be accelerated, prefetch information corresponding to the process is acquired, the prefetch information includes a file path, a shift value and a length value of a data block required by the process. Generally, the prefetch information represents the storage position of the data block required by the process on a low speed storage device.

It should be pointed out that, it can be learned from the first embodiment that the prefetch information is generated after sorting data blocks required by each process according to a preset object. Therefore, the prefetch information stored in the terminal database includes process prefetch information, and/or thread prefetch information, and/or module prefetch information, and/or file prefetch information. When prefetch information corresponding to a process to be accelerated is obtained, one of the four kinds of prefetch information corresponding to the process to be accelerated is preferably obtained according to practical conditions, which will be specifically described according to the subsequent third and fourth embodiments.

Step 304: read a corresponding data block into a system cache according to the acquired prefetch information.

After the prefetch information corresponding to the process to be accelerated is acquired, the corresponding data block is read into the system cache according to the prefetch information. Generally, the system cache is a high speed storage device which may be a physical page, or may be both a physical page and a page swap file, wherein the physical page is a storage unit in a terminal memory in general, while the page swap file is generally a storage unit in a terminal hard disk configured to perform page replacement with the memory.

Step 306: complete a startup procedure of the process to be accelerated using the data block in the system cache.

After the process to be accelerated has been established in the procedure of operating system startup, the startup of the process is completed using the data block in the system cache.

To sum up, the method for accelerating a startup of an operating system provided by the second embodiment prefetches the data blocks required by all or parts of the processes in the procedure of operating system startup from the low speed storage device into a high speed storage device so that the number of occurrences of page faults and the number of read-write operations of the low-speed storage device in the procedure of operating system startup are greatly reduced and the startup time of a process corresponding to each program can be effectively reduced, thereby achieving the effect of significantly improving the startup speed of an operating system.

Since the prefetching operations may be implemented at different times, the present disclosure will describe the operating system startup acceleration method through different embodiments.

Embodiment 3, taking a prefetching operation implemented in a period of IO idle time during the procedure of operating system startup for example.

Figure 4:
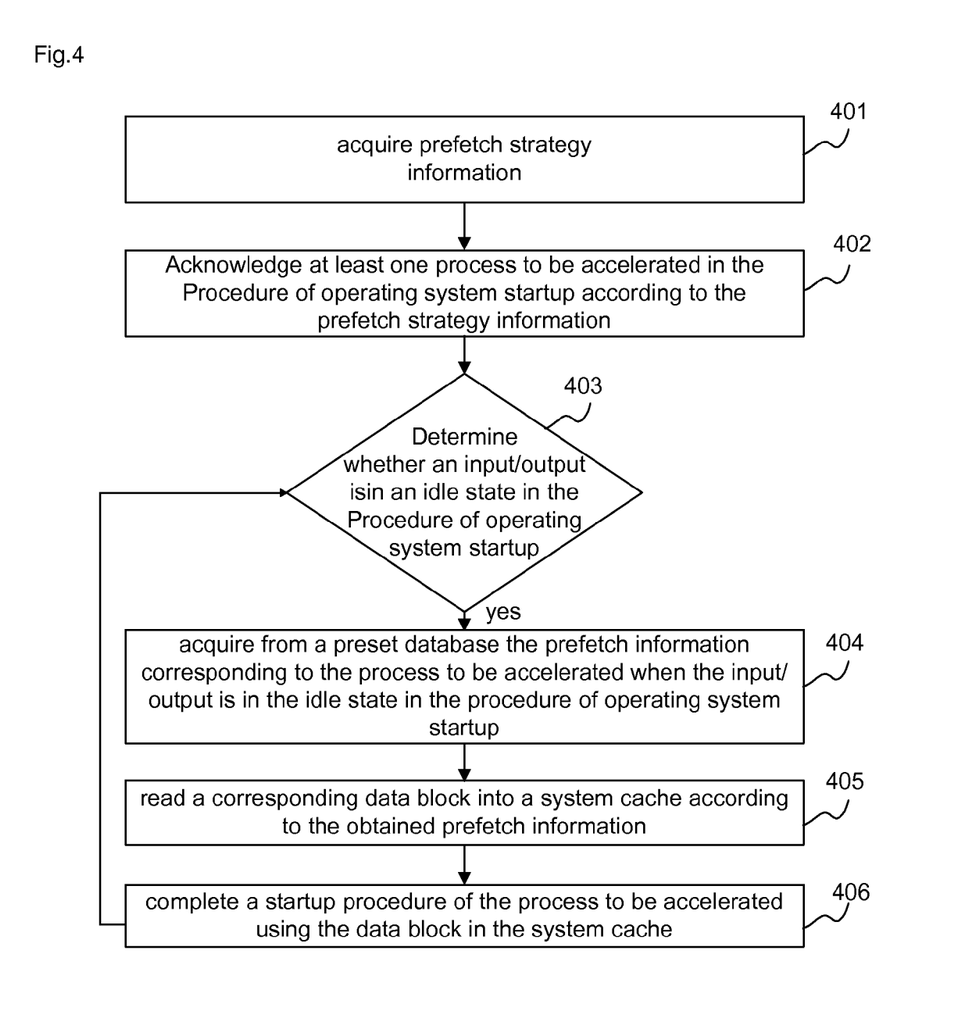
FIG. 4 is a flowchart of an operating system startup acceleration method provided by the third embodiment of the present disclosure.

FIG. 4 illustrates a flowchart of a method for accelerating an operating system provided by the third embodiment of the present disclosure. The operating system startup acceleration method may be applied in a terminal. The terminal may be any hardware device including a desktop computer, a laptop, a tablet computer, a smart phone and the like, on which an operating system runs and which includes two levels of storage devices. A database configured to store prefetch information is preset in the terminal. The operating system startup acceleration method comprises:

Step 401: acquire prefetch strategy information.

After the terminal is powered on, a prefetch driver is loaded when drivers are loaded. The prefetch strategy information is acquired by the prefetch driver. The prefetch strategy information is information pre-designated by a user, i.e. the user selects a prefetch strategy. For example, the user pre-selects to accelerate all processes in the procedure of operating system startup, or may also only select to accelerate part of the processes.

Step 402: acknowledge at least one process to be accelerated in the procedure of operating system startup according to the prefetch strategy information.

The prefetch driver acknowledges processes to be accelerated in the procedure of operating system startup according to the prefetch strategy information. The processes to be accelerated may be all processes, or may be part of the processes, which are selected by the user.

Step 403: determine whether an input/output is in an idle state in the procedure of operating system startup.

Since IO is in the idle state in some time intervals during the power-on and startup procedure, a data block required by the process to be accelerated during these time intervals may be prefetched so as to balance the load of the operating system. At the same time, the prefetch strategy information in Step 402 also indicates the to-be-accelerated processes, data blocks of which are prefetched in each IO idle period, or the number of the to-be-accelerated processes, data blocks of which are prefetched in each IO idle period.

Therefore, the prefetch driver needs to determine whether IO is in the idle state in the procedure of operating system startup. Specifically, the prefetch driver monitors parameters including the current IO traffic etc. to determine whether IO is in the idle state in the procedure of operating system startup.

Step 404: acquire from a preset database the prefetch information corresponding to the process to be accelerated when the input/output is in the idle state in the procedure of operating system startup.

When it is detected that IO is in the idle state in the procedure of operating system startup, the prefetch driver acquires from the preset database the prefetch information corresponding to the process to be accelerated. The process to be accelerated is acquired from the prefetch strategy information. The preset database stores prefetch information corresponding to all processes and the prefetch information includes a file path, a shift value and a length value of the data block required by the process.

In this step, for a process to be accelerated, the acquired prefetch information is preferably one of process prefetch information, thread prefetch information, module prefetch information and file prefetch information corresponding to the process to be accelerated.

Step 405: read a corresponding data block into a system cache according to the obtained prefetch information.

After the prefetch information corresponding to the process to be accelerated is acquired, the corresponding data block is read into the system cache according to the prefetch information. Generally, the system cache is a high speed storage device, which may be a physical page in a memory, or may be a physical page and a page swap file.

After this prefetching operation is completed, the procedure of operating system startup has not been completed, return to Step 403 and wait for the next IO idle period to perform the next prefetching operation.

It should be noted that, although the prefetching operation may be implemented in different IO idle periods, for a process to be accelerated, related prefetching operation of data blocks required by the process to be accelerated still needs to be completed before the process to be accelerated is established and truly executed.

Step 406: complete a startup procedure of the process to be accelerated using the data block in the system cache.

When the process to be accelerated is established and truly executed in the procedure of operating system startup, the startup procedure of the process is completed using the data block in the system cache.

To sum up, the method for accelerating a startup of an operating system provided by the third embodiment prefetches data blocks required by all or part of the processes in the procedure of operating system startup so that the number of occurrences of page faults and the number of read-write operations of the low-speed storage device in the procedure of operating system startup are greatly reduced and the startup time of a process corresponding to each program can be effectively reduced, thereby achieving the effect of significantly improving the startup speed of an terminal. At the same time, the operating system startup acceleration method provided by the third embodiment uses IO idle periods in the procedure of operating system startup to complete prefetching so as to achieve load balance and higher efficiency of the system.

The following embodiment will illustrate a prefetching operation implemented in parallel when a process is established.

Embodiment 4

Figure 5:
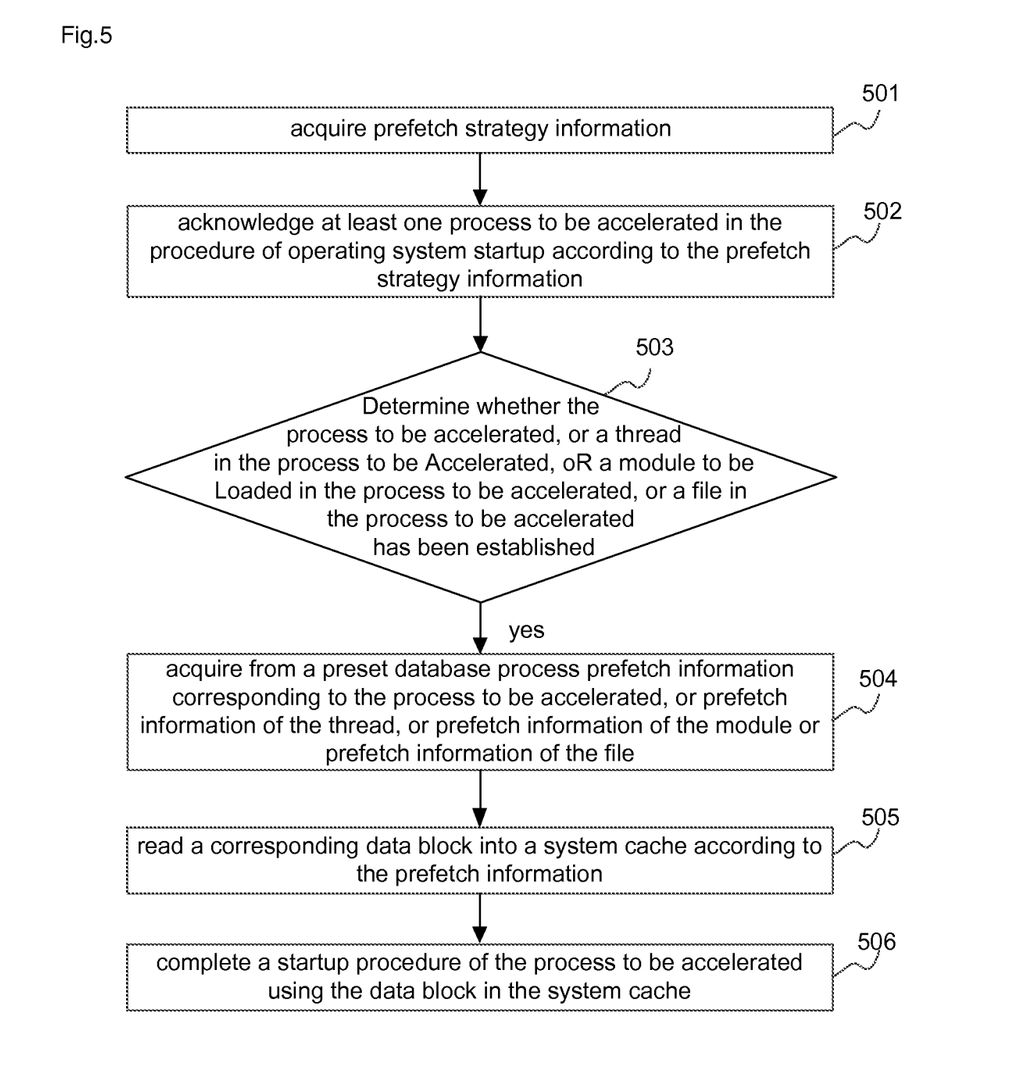
FIG. 5 is a flowchart of an operating system startup acceleration method provided by the fourth embodiment of the present disclosure.

FIG. 5 illustrates a flowchart of a method for accelerating an operating system provided by the fourth embodiment of the present disclosure. The operating system startup acceleration method may be applied in a terminal. The terminal may be any hardware device including a desktop computer, a laptop, a tablet computer, a smart phone and the like, on which an operating system runs and which includes two levels of storage devices. A database configured to store prefetch information is preset in the terminal. The operating system startup acceleration method includes:

Step 501: acquire prefetch strategy information.

After the terminal is powered on, a prefetch driver is loaded when drivers are loaded. The prefetch strategy information is obtained by the prefetch driver. The prefetch strategy information is information pre-designated by a user, i.e. the user selects a prefetch strategy. For example, the user pre-selects to accelerate all processes in the procedure of operating system startup, or may also only select to accelerate part of the processes.

Step 502: acknowledge at least one process to be accelerated in the procedure of operating system startup according to the prefetch strategy information.

The prefetch driver acknowledges processes to be accelerated in the procedure of operating system startup according to the prefetch strategy information. The processes to be accelerated may be all processes, or may be part of the processes, which are selected by the user.

At the same time, after all processes to be accelerated are acknowledged, the prefetch driver registers some event callbacks to the system. These event callbacks may be process establishment message callbacks, thread establishment message callbacks, module establishment message callbacks, file establishment message callbacks and the like. In this way, after a process to be accelerated has been established, a corresponding process establishment callback function will be triggered immediately; or a corresponding thread establishment callback function will be triggered immediately after a thread in the process to be accelerated has been established; or a corresponding module establishment callback function will be triggered immediately after a module to be loaded in the process to be accelerated has been established; or a corresponding file establishment callback function will be triggered immediately after a file to be loaded in the process to be accelerated has been loaded.

Step 503: determine whether the process to be accelerated, or a thread in the process to be accelerated, or a module to be loaded in the process to be accelerated, or a file in the process to be accelerated has been established; if yes, go to Step 504.

This step is implemented by determining whether a callback function is triggered. For example, if a process has been established, then a callback function corresponding to this process will be triggered and it is regarded that the process is established. However, the process has not been truly executed at the moment. For another example, if a thread in a process has been established, then a callback function corresponding to this thread will be triggered and it is regarded that the thread is established. However, the thread has not been truly executed at the moment.

Step 504: acquire from the preset database process prefetch information corresponding to the process to be accelerated, or prefetch information of the thread, or prefetch information of the module or prefetch information of the file.

In this step, if a callback function of a process is triggered, then process prefetch information corresponding to the process to be accelerated is acquired from the preset database. If a callback function of a thread is triggered, then prefetch information of the thread corresponding to the process to be accelerated is acquired from the preset database. If a callback function of a module to be loaded is triggered, then prefetch information of the module corresponding to the process to be accelerated is acquired from the preset database. If a callback function of a file to be loaded is triggered, then prefetch information of the file corresponding to the process to be accelerated is acquired from the preset database.

Step 505: read a corresponding data block into a system cache according to the prefetch information.

After the prefetch information has been acquired, the corresponding data block is read into the system cache. Generally, the system cache is a high speed storage device, which may be a physical page in a memory, or may be a physical page and a page swap file. In this way, prefetching operation of a related data block may be completed before actually implementing or loading the process or a unit in the process.

Step 506: complete a startup procedure of the process to be accelerated using the data block in the system cache.

When the process to be accelerated is established and truly executed in the procedure of operating system startup, the startup procedure of the process is completed using the data block in the system cache.

To sum up, the method for generating prefetch information provided by the fourth embodiment prefetches data blocks required by all or part of the processes in the procedure of operating system startup so that the number of occurrences of page faults and the number of read-write operations of a low-speed storage device in the procedure of operating system startup are greatly reduced and the startup time of a process corresponding to each program can be effectively reduced, thereby achieving the effect of significantly improving the startup speed of a terminal. At the same time, the operating system startup acceleration method provided by the fourth embodiment further completes the prefetching operation by performing the prefetching operation in parallel with process establishment, which is more applicable to prefetching performed when there are a large number of processes that need to be accelerated.

Embodiment 5

Figure 6:
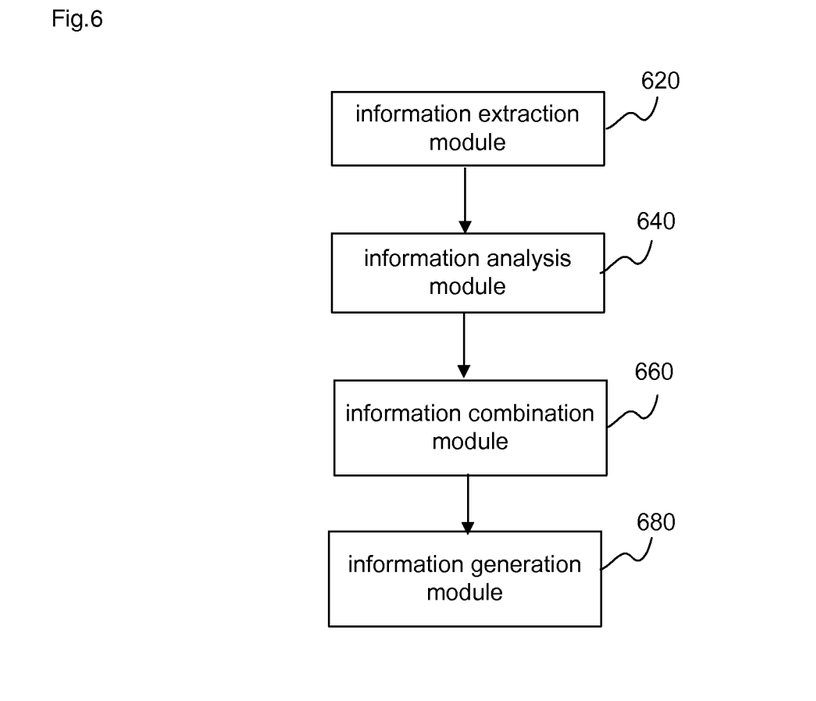
FIG. 6 is a structural block diagram of a prefetch information generation sub-device provided by the fifth embodiment of the present disclosure.

FIG. 6 illustrates a structural block diagram of a prefetch information generation sub-device provided by the fifth embodiment of the present disclosure. The prefetch information generation sub-device is configured to generate prefetch information and may be applied in a terminal or a server. The prefetch information generation sub-device includes an information extraction module 620, an information analysis module 640, an information combination module 660 and an information generation module 680.

The information extraction module 620 is configured to extract input/output information and page fault information in the procedure of operating system startup.

The information analysis module 640 is configured to acquire a file path, a shift value and a length value of a data block required by each process in the procedure of operating system startup according to the input/output information and the page fault information.

The information combination module 660 is configured to combine shift values and length values of contiguous data blocks with the same file path.

Figure 7:
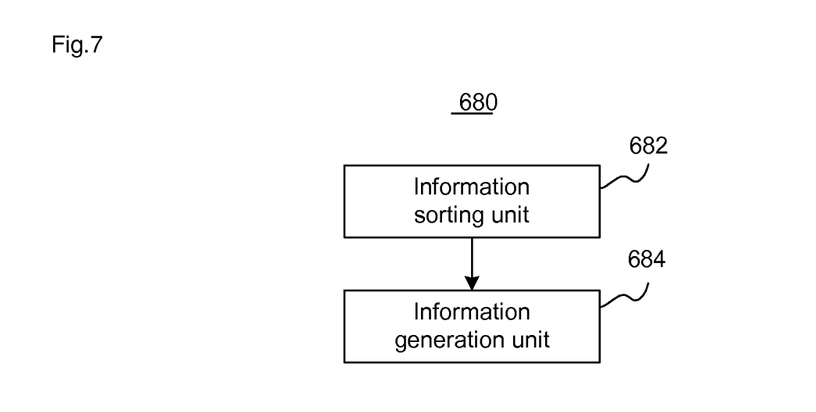
FIG. 7 is a structural block diagram of an information generation module in a prefetch information generation sub-device of the present disclosure.

The information generation module 680 is configured to generate the prefetch information according file paths, shift values and length values of the combined data blocks.

wherein the information generation module 680 includes: an information sorting unit 682 and an information generation unit 684, as shown in FIG. 7, wherein the information sorting unit 682 is configured to sort the combined data blocks according to a preset object, wherein the preset object comprises a process and/or a thread and/or a module to be loaded the process and/or a file to be loaded in the process; the information generation unit 684 is configured to generate prefetch information of the preset object according to file paths, shift values and length values of the sorted data blocks. The generated prefetch information of the preset object includes: process prefetch information, and/or thread prefetch information, and/or module prefetch information, and/or file prefetch information.

To sum up, the prefetch information generation sub-device provided by the fifth embodiment of the present disclosure statistically analyzes data blocks required in the procedure of operating system startup and combines contiguous data blocks among the data blocks into new data blocks so as to acquire file paths, shift values and length values of data blocks required by processes in the procedure of operating system startup. The prefetch information may be generated according to these information for further use.

It should be noted that when the prefetch information generation sub-device provided by the fifth embodiment generates the prefetch information, only division of the functional modules are illustrated. In practical application, the functions may be implemented by different functional modules as required, i.e. the internal structure of the device is divided into different functional modules to implement all or part of the functions described above. In addition, the prefetch information generation sub-device provided by the fifth embodiment and the prefetch information generating method provided by the first embodiment belong to the same conception. Please see details of specific implementation processes of the prefetch information generation sub-device in the embodiment of the method.

Embodiment 6

Figure 8:
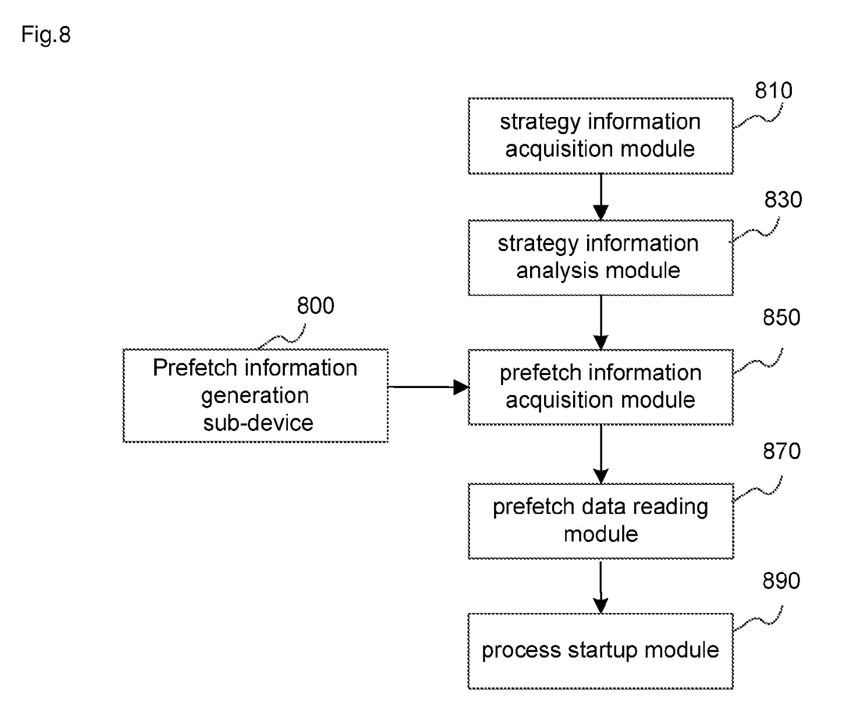
FIG. 8 is a structural block diagram of an operating system startup acceleration device provided by the sixth embodiment of the present disclosure.

FIG. 8 illustrates a structural block diagram of an operating system startup acceleration device provided by the sixth embodiment of the present disclosure. The operating system startup acceleration device may be applied in a terminal. The terminal may be any hardware device including a desktop computer, a laptop, a tablet computer, a smart phone and the like, on which an operating system runs and which includes two levels of storage devices. A database configured to store the prefetch information generated by the operating system startup acceleration method provided by the first embodiment or the prefetch information generation sub-device provided by the fifth embodiment may be preset in the terminal. The operating system startup acceleration device includes: a strategy information acquisition module 810, a strategy information analysis module 830, a prefetch information acquisition module 850, a prefetch data reading module 870 and a process startup module 890. The device further includes a prefetch information generation sub-device 800 having a structure as shown in FIG. 6.

The strategy information acquisition module 810 is configured to acquire prefetch strategy information.

The strategy information analysis module 830 is configured to acknowledge at least one process to be accelerated in the procedure of operating system startup according to the prefetch strategy information.

The prefetch information acquisition module 850 is configured to acquire prefetch information corresponding to at least one process to be accelerated in the procedure of operating system startup. The prefetch information includes a file path, a shift value and a length value of a data block which is required by the process to be accelerated.

Figure 9:
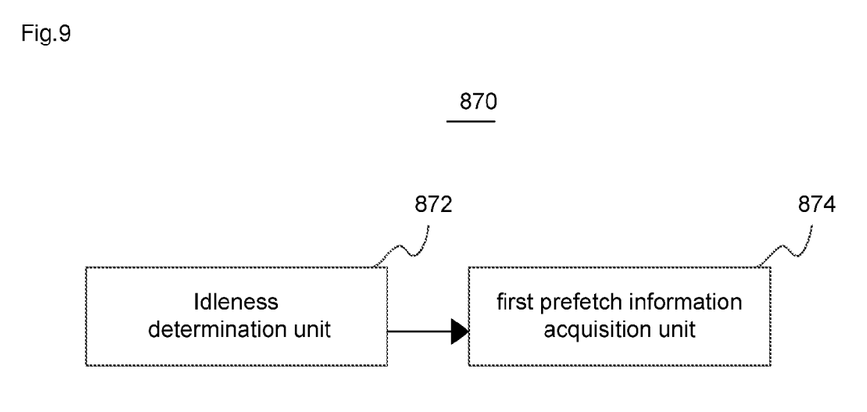
FIG. 9 is a structural block diagram of a prefetch information acquisition module in an operating system startup acceleration device of the present disclosure.

In a preferred condition, the prefetch information acquisition module 850 includes an idleness determination unit 852 and a first prefetch information acquisition unit 854, as shown in FIG. 9, wherein the idleness determination unit 852 is configured to determine whether input/output is in an idle state in the procedure of operating system startup; the first prefetch information acquisition unit 854 is configured to, when the input/output is in the idle state in the procedure of operating system startup, acquire from a preset database the prefetch information corresponding to the process to be accelerated. The acquired prefetch information corresponding to the process to be accelerated includes, process prefetch information, or thread prefetch information, or module prefetch information or file prefetch information.

Figure 10:
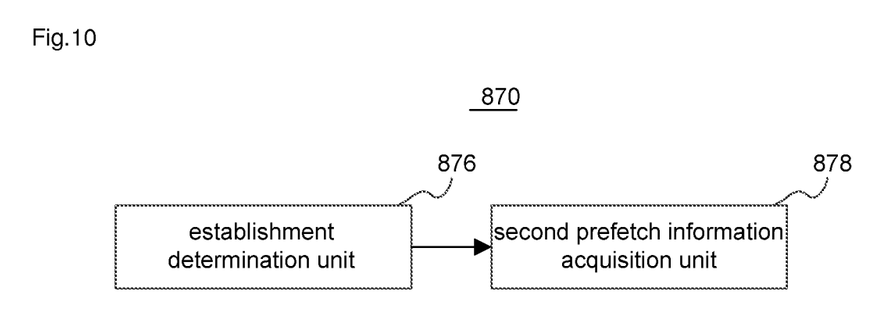
FIG. 10 is another structural block diagram of a prefetch information acquisition module in an operating system startup acceleration device of the present disclosure.

In another preferred condition, the prefetch information acquisition module 850 includes an establishment determination unit 856 and a second prefetch information acquisition unit 858, as shown in FIG. 10, wherein the establishment determination unit 856 is configured to determine whether the process to be accelerated, or a thread in the process to be accelerated, or a module to be loaded in the process to be accelerated, or a file to be loaded in the process to be accelerated has been established; the second prefetch information acquisition unit 858 is configured to, when the process to be accelerated has been established, acquire from the preset database, process prefetch information corresponding to the process to be accelerated; when the thread in the process to be accelerated has been established, acquire from the preset database, prefetch information of the thread corresponding to the process to be accelerated; when the module to be loaded in the process to be accelerated has been established, acquire from the preset database, prefetch information of the module corresponding to the process to be accelerated; when the file to be loaded in the process to be accelerated has been established, acquire from the preset database, prefetch information of the file corresponding to the process to be accelerated.

The prefetch data reading module 870 is configured to read the corresponding data block into a system cache according to the obtained prefetch information. The system cache includes a physical page, or a physical page and a page swap file.

The process startup module 890 is configured to complete the startup procedure of the process to be accelerated using the data block in the system cache.

To sum up, the operating system startup acceleration device provided by the sixth embodiment prefetches the data blocks required by all or parts of the processes in the procedure of operating system startup so that the number of occurrences of page faults and the number of read-write operations of a low-speed storage device in the procedure of operating system startup are greatly reduced and the startup time of a process corresponding to each program can be effectively reduced, thereby achieving the effect of significantly improving the startup speed of an operating system.

It should be noted that when the operating system startup acceleration device provided by the embodiment above implements operating system startup acceleration, only division of the functional modules are illustrated. In practical application, the functions may be implemented by different functional modules as required, i.e. the internal structure of the device is divided into different functional modules to implement all or part of the functions described above. In addition, the operating system startup acceleration device provided by the embodiment above and embodiments of the operating system startup acceleration methods belong to the same conception. Please see details above, which will not be reproduced here.

When being implemented in the form of a software functional module and sold or used as a separate product, the integrated modules of the embodiments of the present disclosure may be stored in a computer-readable medium. Based on this understanding, the technical solutions of the embodiments of the present disclosure essentially, or the part contributing to the prior art, may be implemented in the form of a software product. The computer software product is stored in a computer readable medium, including several instructions for instructing a computer device (which may be a personal computer, a server, a network device or the like) to execute all or a part of the method described in each embodiment of the present disclosure. The computer readable medium includes: various mediums that can store program codes, including a U-disk, a removable hard disk, a Read-Only Memory (ROM), a Random Access Memory (RAM), a magnetic disk, or an optical disk and the like. Therefore, the embodiments of the present disclosure are not limited to any specific combination of hardware and software.

Accordingly, an embodiment of the present disclosure further provides a computer readable medium which stores computer program. The computer program is configured to execute the operating system startup acceleration method according to the embodiments of the present disclosure.

Above are only preferred embodiments of the present disclosure and not intended to limit the scope of protection of the present disclosure.

The invention claimed is:

1. A method for accelerating a startup of an operating system, comprising:
   acquiring prefetch strategy information;
   acknowledging that all or part of the processes in the procedure of operating system startup are the at least one process to be accelerated according to the prefetch strategy information;
   acquiring prefetch information corresponding to at least one process to be accelerated in a procedure of operating system startup, wherein the prefetch information comprises a file path, a shift value and a length value of a data block required by the process to be accelerated;
   reading a corresponding data block into a system cache according to the acquired prefetch information;
   completing a startup procedure of the process to be accelerated using the data block in the system cache;
   wherein the step of acquiring prefetch information corresponding to at least one process to be accelerated in a procedure of operating system startup comprises:
   determining whether an input/output is in an idle state in the procedure of operating system startup;
   acquiring from a preset database the prefetch information corresponding to the process to be accelerated when the input/output is in the idle state in the procedure of operating system startup;
   the acquired prefetch information corresponding to the process to be accelerated comprises: process prefetch information, or thread prefetch information, or module prefetch information or file prefetch information.

2. A method for accelerating a startup of an operating system, comprising:
   acquiring prefetch strategy information;
   acknowledging that all or part of the processes in the procedure of operating system startup are the at least one process to be accelerated according to the prefetch strategy information;
   acquiring prefetch information corresponding to at least one process to be accelerated in a procedure of operating system startup, wherein the prefetch information comprises a file path, a shift value and a length value of a data block required by the process to be accelerated;
   reading a corresponding data block into a system cache according to the acquired prefetch information;
   completing a startup procedure of the process to be accelerated using the data block in the system cache;
   wherein the step of acquiring prefetch information corresponding to at least one process to be accelerated in a procedure of operating system startup comprises:
   determining whether the process to be accelerated, or a thread in the process to be accelerated, or a module to be loaded in the process to be accelerated, or a file to be loaded in the process to be accelerated has been established;

when the process to be accelerated has been established, acquiring from the preset database, prefetch information corresponding to the process to be accelerated; when the thread in the process to be accelerated has been established, acquiring from the preset database, prefetch information of the thread corresponding to the process to be accelerated; when the module to be loaded in the process to be accelerated has been established, acquiring from the preset database, prefetch information of the module corresponding to the process to be accelerated; when the file to be loaded in the process to be accelerated has been established, acquiring from the preset database, prefetch information of the file corresponding to the process to be accelerated.

3. A method for accelerating a startup of an operating system, comprising:

acquiring prefetch information corresponding to at least one process to be accelerated in a procedure of operating system startup, wherein the prefetch information comprises a file path, a shift value and a length value of a data block required by the process to be accelerated;

reading a corresponding data block into a system cache according to the acquired prefetch information;

completing a startup procedure of the process to be accelerated using the data block in the system cache;

the method further comprising generating the prefetch information, wherein the step of generating the prefetch information comprises:

extracting input/output information and page fault information in the procedure of operating system startup;

acquiring a file path, a shift value and a length value of a data block required by respective processes during the procedure of operating system startup according to the input/output information and the page fault information;

combining shift values and length values of contiguous data blocks with the same file path;

generating the prefetch information according to files paths, shift values and length values of the combined data blocks.

4. The method according to claim 3, wherein the step of generating the prefetch information according to files paths, shift values and length values of the combined data blocks comprises:

sorting the combined data blocks according to a preset object, wherein the present object comprises: a process and/or a thread and/or a module to be loaded in the process and/or a file to be loaded in the process, generating the prefetch information of the preset object according to file paths, shift values and length values of the sorted data blocks;

the generated prefetch information of the preset object comprises: prefetch information, and/or thread prefetch information, and/or module prefetch information, and/or file prefetch information.

5. A device for accelerating a startup of an operating system, comprising:

one or more hardware processors; and a plurality of program modules stored in a non-transitory computer-readable medium, when, executed by the one or more hardware processors, cause the device to perform predefined functions, the plurality of program modules further comprising:

a prefetch information acquisition module configured to acquire prefetch information corresponding to at least one process to be accelerated in the procedure of operating system startup, wherein the prefetch information comprises a file path, a shift value and a length value of a data block required by the process to be accelerated;

a prefetch data reading module configured to read a corresponding data block into a system cache according to the acquired prefetch information;

a process startup module configured to complete a startup procedure of the process to be accelerated using the data block in the system cache;

the device further comprising a strategy information acquisition module and a strategy information analysis module;

the strategy information acquisition module configured to acquire prefetch strategy information;

the strategy information analysis module configured to acknowledge all or part of the processes in the procedure of operating system startup are the at least one process to be accelerated according to the prefetch strategy information;

wherein the prefetch information acquisition module comprises: an idleness determination unit and a first prefetch information acquisition unit;

the idleness determination unit is configured to determine whether input/output is in an idle state in the procedure of operating system startup;

the first prefetch information acquisition unit is configured to, when the input/output is in the idle state in the procedure of operating system startup, acquire from a preset database the prefetch information corresponding to the process to be accelerated; the acquired prefetch information corresponding to the process to be accelerated comprises: process prefetch information, or thread prefetch information, or module prefetch information or file prefetch information.

6. A device for accelerating a startup of an operating system, comprising:

one or more hardware processors; and a plurality of program modules stored in a non-transitory computer-readable medium, when, executed by the one or more hardware processors, cause the device to perform predefined functions, the plurality of program modules further comprising:

a prefetch information acquisition module configured to acquire prefetch information corresponding to at least one process to be accelerated in the procedure of operating system startup, wherein the prefetch information comprises a file path, a shift value and a length value of a data block required by the process to be accelerated;

a prefetch data reading module configured to read a corresponding data block into a system cache according to the acquired prefetch information;

a process startup module configured to complete a startup procedure of the process to be accelerated using the data block in the system cache;

the device further comprising a strategy information acquisition module and a strategy information analysis module;

the strategy information acquisition module configured to acquire prefetch strategy information;

the strategy information analysis module configured to acknowledge all or part of the processes in the procedure of operating system startup are the at least one process to be accelerated according to the prefetch strategy information;

wherein the prefetch information acquisition module comprises: an establishment determination unit and a second prefetch information acquisition unit;

the establishment determination unit is configured to determine whether the process to be accelerated, or a thread in the process to be accelerated, or a module to be loaded in the process to be accelerated, or a file to be loaded in the process to be accelerated has been established;

the second prefetch information acquisition unit is configured to, when the process to be accelerated has been established, acquire from the preset database, process prefetch information corresponding to the process to be accelerated; when the thread in the process to be accelerated has been established, acquire from the preset database, prefetch information of the thread corresponding to the process to be accelerated; when the module to be loaded in the process to be accelerated has been established, acquire from the preset database, prefetch information of the module corresponding to the process to be accelerated; when the file to be loaded in the process to be accelerated has been established, acquire from the preset database, prefetch information of the file corresponding to the process to be accelerated.

7. A device for accelerating a startup of an operating system, comprising:
one or more hardware processors; and
a plurality of program modules stored in a non-transitory computer-readable medium, when, executed by the one or more hardware processors, cause the device to perform predefined functions, the plurality of program modules further comprising:
a prefetch information acquisition module configured to acquire prefetch information corresponding to at least one process to be accelerated in the procedure of operating system startup, wherein the prefetch information comprises a file path, a shift value and a length value of a data block required by the process to be accelerated;
a prefetch data reading module configured to read a corresponding data block into a system cache according to the acquired prefetch information;
a process startup module configured to complete a startup procedure of the process to be accelerated using the data block in the system cache;
wherein the device further comprises a prefetch information generation sub-device configured to generate prefetch information;
wherein the prefetch information generation sub-device comprises:
an information extraction module configured to extract input/output information and page fault information in the procedure of operating system startup;
an information analysis module configured to acquire a file path, a shift value and a length value of a data block required by respective processes during the procedure of operating system startup according to the input/output information and the page fault information;
an information combination module configured to combine shift values and length values of contiguous data blocks with the same file path;
an information generation module configured to generate the prefetch information according file paths, shift values and length values of the combined data blocks.

8. The device according to claim 7, wherein the information generation module comprises: an information sorting unit and an information generation unit;
the information sorting unit is configured to sort the combined data blocks according to a preset object, wherein the preset object comprises: a process and/or a thread and/or a module to be loaded the process and/or a file to be loaded in the process;
the information generation unit is configured to generate prefetch information of the preset object according to file paths, shift values and length values of the sorted data blocks; the generated prefetch information of the preset object comprises: process prefetch information, and/or thread prefetch information, and/or module prefetch information and/or file prefetch information.

* * * * *